United States Patent
Simpson et al.

(10) Patent No.: US 6,997,264 B2
(45) Date of Patent: Feb. 14, 2006

(54) METHOD OF JOINTING AND RUNNING EXPANDABLE TUBULARS

(75) Inventors: Neil A. A. Simpson, Aberdeen (GB); Clayton Plucheck, Tomball, TX (US); Robert J. Coon, Missouri City, TX (US)

(73) Assignee: Weatherford/Lamb, Inc., Houston, TX (US)

( * ) Notice: Subject to any disclaimer, the term of this patent is extended or adjusted under 35 U.S.C. 154(b) by 83 days.

(21) Appl. No.: 10/269,103

(22) Filed: Oct. 10, 2002

(65) Prior Publication Data

US 2004/0069498 A1 Apr. 15, 2004

(51) Int. Cl.
- *E21B 17/043* (2006.01)
- *E21B 43/10* (2006.01)
- *E21B 29/10* (2006.01)
- *F16L 25/10* (2006.01)

(52) U.S. Cl. ............... 166/380; 166/55; 166/207; 166/242.6; 166/277; 285/333; 285/355; 285/390

(58) Field of Classification Search ........ 166/377–382, 166/277, 297, 59, 75.11, 77.51, 85.1, 206, 166/207, 242.1, 242.6; 285/333, 334, 390, 285/355
See application file for complete search history.

(56) References Cited

U.S. PATENT DOCUMENTS

| | | | | |
|---|---|---|---|---|
| 3,746,091 A | * | 7/1973 | Owen et al. ............... 166/107 |
| RE30,647 E | * | 6/1981 | Blose ..................... 285/332.2 |
| 4,707,001 A | * | 11/1987 | Johnson .................. 285/332.3 |
| 4,768,275 A | | 9/1988 | Schmitz |
| 4,770,448 A | * | 9/1988 | Strickland et al. .......... 285/333 |
| 5,066,052 A | * | 11/1991 | Read ........................ 285/334 |
| 5,318,131 A | * | 6/1994 | Baker ....................... 166/382 |
| 5,360,240 A | * | 11/1994 | Mott ......................... 285/95 |
| 5,415,441 A | * | 5/1995 | Kilgore et al. .............. 285/322 |
| 5,498,035 A | * | 3/1996 | Blose et al. ................. 285/94 |
| 5,924,745 A | * | 7/1999 | Campbell .................... 285/90 |
| 6,021,850 A | * | 2/2000 | Wood et al. ................ 166/380 |
| 6,047,997 A | * | 4/2000 | Olivier ..................... 285/333 |
| 6,106,024 A | * | 8/2000 | Herman et al. .............. 285/18 |
| 6,112,818 A | * | 9/2000 | Campbell .................. 166/384 |
| 6,273,634 B1 | * | 8/2001 | Lohbeck .................... 403/297 |
| 6,322,109 B1 | * | 11/2001 | Campbell et al. ............ 285/92 |
| 6,322,110 B1 | * | 11/2001 | Banker et al. .............. 285/334 |
| 6,409,175 B1 | | 6/2002 | Evans et al. | |

(Continued)

FOREIGN PATENT DOCUMENTS

EP 1295060 1/2005

(Continued)

OTHER PUBLICATIONS

U.K. Search Report, Application No. GB 0323678.3, dated Mar. 23, 2004.

*Primary Examiner*—Jennifer H Gay
(74) *Attorney, Agent, or Firm*—Patterson & Sheridan, L.L.P.

(57) ABSTRACT

A connector arrangement used for connecting a first tubular to a second tubular. The first tubular member has at least one circumferential ring profile, and the second tubular member has a corresponding number of matching circumferential ring profiles. When the ring profiles of the two tubulars are mated and interlocked, they form separate and independent fluid seals as well as a mechanical lock able to hold the tubulars together during future expansion of the entire tubular and joint. Further, selecting properties of the tubulars such as yield strength and modulus of elasticity or constraining a diameter of one of the tubulars during expansion or compression forms a tight connection due to elastic recovery of the tubulars.

31 Claims, 8 Drawing Sheets

U.S. PATENT DOCUMENTS

| | | | |
|---|---|---|---|
| 6,425,444 B1 | 7/2002 | Metcalfe et al. | 166/387 |
| 6,454,013 B1 * | 9/2002 | Metcalfe | 166/382 |
| 6,457,532 B1 | 10/2002 | Simpson | 166/380 |
| 6,485,063 B1 * | 11/2002 | Olivier | 285/333 |
| 6,581,980 B1 * | 6/2003 | DeLange et al. | 285/334 |
| 6,607,220 B1 * | 8/2003 | Sivley, IV | 285/334 |
| 6,622,797 B1 * | 9/2003 | Sivley, IV | 166/380 |
| 2002/0027363 A1 * | 3/2002 | Mallis et al. | 285/334 |
| 2002/0163192 A1 * | 11/2002 | Coulon et al. | 285/331 |
| 2003/0075338 A1 * | 4/2003 | Sivley | 166/380 |
| 2003/0075924 A1 * | 4/2003 | Olivier | 285/331 |
| 2003/0107213 A1 * | 6/2003 | Baugh et al. | 285/92 |
| 2003/0168858 A1 * | 9/2003 | Hashem | 285/334 |
| 2003/0234538 A1 * | 12/2003 | Hashem | 285/333 |
| 2004/0007364 A1 * | 1/2004 | Simpson | 166/380 |
| 2004/0017081 A1 * | 1/2004 | Simpson et al. | 285/333 |
| 2004/0060706 A1 * | 4/2004 | Stephenson | 166/380 |
| 2004/0113428 A1 * | 6/2004 | Macaulay | 285/333 |
| 2004/0135370 A1 * | 7/2004 | Evans et al. | 285/333 |

FOREIGN PATENT DOCUMENTS

| | | |
|---|---|---|
| GB | 2 388 391 | 11/2003 |
| WO | WO 9721901 A2 * | 6/1997 |
| WO | WO 02/01102 | 1/2002 |
| WO | WO 02/053867 | 7/2002 |
| WO | WO 03/048521 | 6/2003 |

* cited by examiner

METHOD OF JOINTING AND RUNNING EXPANDABLE TUBULARS

BACKGROUND OF THE INVENTION

1. Field of the Invention

The present invention generally relates to tubular connectors. In particular, the present invention relates to a method of connecting tubulars in such a way that the connection is prevented from becoming unmade in response to expansion of the tubulars. More particularly, the present invention provides a tubular connection wherein there is at least one concentric interlocking ring profile.

2. Description of the Related Art

In order to access hydrocarbons in subsurface formations, it is typically necessary to drill a bore into the earth. The process of drilling a borehole and of subsequently completing the borehole in order to form a wellbore requires the use of various tubular strings. These tubulars are typically run downhole where the mechanical and seal integrity of the jointed connections are critically important both in the original make-up of the tubulars and during expansion of the tubulars.

Typically threaded connections are used to connect multiple tubular members end-to-end. This is usually accomplished by providing tubulars that have a simple male to female threaded connection. The male end is generally referred to as a pin, and the female end as a box. These tubulars are connected, or "made-up," by transmitting torque against one of the tubulars while the other tubular is held stationary. Torque is transmitted in a single direction in accordance with the direction corresponding with connection make-up. Any torque applied to the joint in the make-up direction will have the effect of continuing to tighten the threaded joint.

When running tubulars there is sometimes a requirement to run jointed tubulars that will later be expanded by various types of expansion mechanisms. These tubulars are typically run downhole where the mechanical and seal integrity of the connections, or joint, are critically important both in the original and expanded state of the tubular. The current methods of achieving this is by the design of modified threaded connections which can be applied and handled in the same way as conventional oil-field tubulars, i.e., stabbed into each other and screwed together by right hand or left hand rotation and then finally torqued up to establish the seal integrity.

This method of connecting tubulars, though a reliable means of connecting non-expanding tubulars, is proving to be problematic when these tubulars are expanded. The reasons for this being mainly due to the changes in geometry of the connection during expansion due to the stresses applied at the threads, or joint area. Conventional tubulars expanded at the joint may, for instance, disengage allowing the lower tubing to fall into the wellbore.

It is well known and understood that during the expansion of solid wall tubulars that the material in the tubing wall is plastically deformed in more than just the circumferential sense. In order for a tubular to increase in diameter by plastic deformation, the material to make up the additional circumferential section of wall in the larger diameter must come from the tubing wall itself either by reduction in wall thickness, or by reduction in tubular length, or a combination of both. In the plain wall section of the tubular this process will normally take place in a relatively controlled and uniform way, however, at the point of a threaded connection the changes in wall section which are required in order to form the thread will introduce a very complex and non-uniform stress and deformation during and after expansion, which will significantly change the thread form and compromise the connection integrity both in terms of its mechanical strength and sealing capability. Additionally, the larger elastic deformation caused by the reduced sections of the tubing wall at the roots of the thread will introduce much higher stresses than in other areas of the expanded tubular. This in turn may lead to joint failure due to these stresses approaching or exceeding the ultimate strength of the tubing material or by introduction of short cycle fatigue caused by the cyclic nature of some expansion processes being applied at these high stress levels.

The objective of the present invention is to resolve many of the problematic areas associated with the expansion of threaded connections. The present invention consists of replacing the conventional thread connections with the introduction of one or more interlocking ring profiles which can be engaged by either the partial plastic deformation of the pin, the partial plastic deformation of the box, or by a combination of the two processes.

This innovative concept of using plastic deformation of the mating parts of the jointed system being described in this invention provides the essential step to making this invention a practical and novel solution to expandable tubular connections. The typical materials used for expandable tubulars must of course be ductile, which in turn means that the connection profiles, also referred to as formations, in this invention should not be highly stressed during the stab-in part of the joint make-up process. To avoid this possibility the connection profiles are designed such that they will pass over each other with little or no induced stress and are located in longitudinal alignment by the introduction of a mating or stop shoulder at the top of the box, or pin, and or shoulders within the joint.

In this position the joint can be made-up by the application of an internal or external force sufficient to cause yield of the pin in expansion or the box in compression. For increased strength it may be desirable for the tubulars to be internally or externally upset at their ends where these joints are machined. However, in a constant wall thickness tubular where the finished expanded tubular must be externally and internally flush, it may be desirable to slightly swedge the pin inwardly or swedge the box outward.

Additionally, it may be preferable to incorporate one or more torque screws. The torque screw would preferably be set externally and extend through the box into the pin. These screws would preferably be positioned near the tubulars' thread profile. Further, by incorporating torque screws, the torque rating of the threads would be greatly increased. In addition to, or as an alternative to, torque screws, the tubulars' walls could be cut with locking castellations or other anti-torque locking means as known to those in the arts.

The handling of these jointed tubulars would require specialized equipment on the rig floor to plastically deform the connections on make-up, and one approach to this is shown in FIG. 8, wherein the pin is being expanded internally. The benefit of this approach would be that the growth of the box could be measured and used for quality assurance of joint make-up and integrity before running the made-up tubulars down hole.

Once made-up these joints would not be disconnectable other than by cutting at or close to each joint. However, systems have been proposed which can easily achieve this on the rig floor in a safe, reliable and timely fashion. One such system introduces rolling element cutters to conventional rig power tongs which could be used to simply cut the tubular in the same way that a plumber cutter cuts copper tubing.

SUMMARY OF THE INVENTION

The present invention provides a connector arrangement for connecting a first tubular to a second tubular. The connection consists of two tubular members designed with matching interlocking circumferential ring profiles. The first tubular member has at least one ring profile of any form, and the second tubular member has matching corresponding ring profile(s). In addition to the ring profiles used to mate the tubulars, each tubular member has at least one mating shoulder designed to align the ring profiles.

In another embodiment of the present invention, the connection consists of intermingling conventional threaded connectors with at least one circumferential ring profile. In this embodiment the threads may more easily seal and hold the tubulars together prior to expansion, and the ring profiles seal and hold the tubulars together after expansion.

In yet another embodiment of the present invention, the connection consists of incorporating a torque resistance means into the prior embodiment. The torque resistance means could consist of one or more torque screws placed near the threaded connection. In this embodiment the tubulars are more able to resist torque and rotational movement. As yet another means to reduce torque in the tubulars, locking profiles, or castellations, could be used.

In another embodiment, the connection consists of selecting tubular properties such as yield strength and modulus of elasticity to provide an elastic recovery of the tubulars in order to form a tight connection. Additionally, providing a tight connection due to elastic recovery of the tubulars can include positioning an anvil in the tubulars to constrain the inside diameter of the pin during compression of the box or positioning a collar around the tubulars to constrain the outside diameter of the box during expansion of the pin.

In operation, the ring profiles of the first tubular are expanded into the matching ring profiles of the second tubular. When stabbing the tubulars together, a stop or mating shoulder will align the ring profiles for mating. After either expansion of the pin or compression of the box, or a combination thereof, the result is a connection that is capable of maintaining its strength and sealing integrity during and after expansion downhole.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENT

Figure 1:
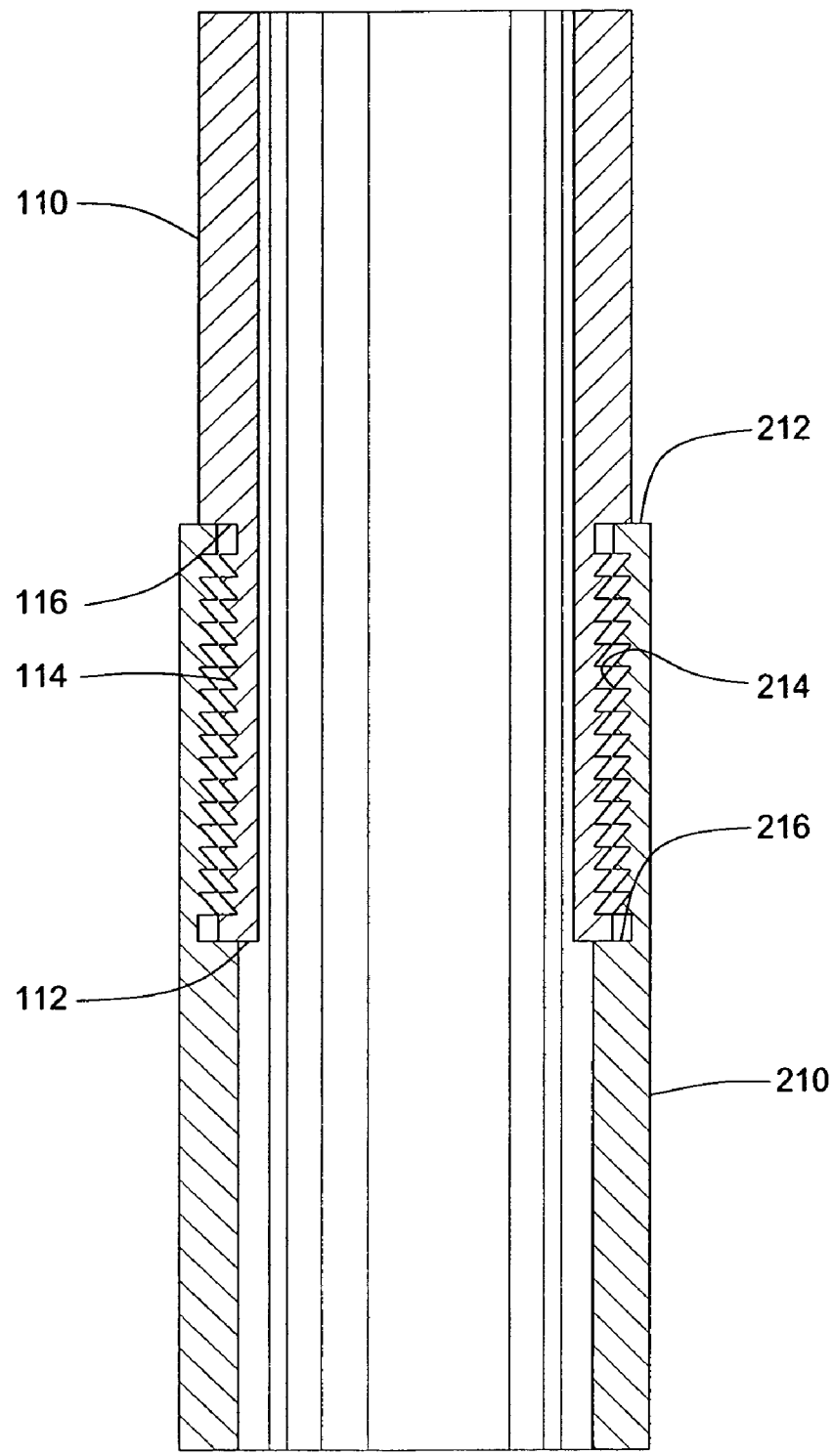
FIG. 1 is a cross-sectional view of a connector of the present invention, with the two tubular members being shown in side view with an example of an interlocking circumferential ring profiles. Also visible are the mating shoulders.

FIG. 1 is a cross-sectional view of a connector 100 of the present invention. As seen, the connector 100 first comprises a first tubular 110 having an end 112. Disposed on the end of the first tubular 110 are external circumferential ring profiles 114. Also disposed on the end 112 of the first tubular 110 distal to the circumferential ring profiles 114 is a mating shoulder 116.

The connector 100 also comprises a second tubular 210 having an end 212. Disposed on the end of the second tubular 210 is a corresponding number of matching internal circumferential ring profiles 214. The tubulars are to be joined by either expanding the ring profiles 114 of the first tubular 110 into the ring profiles 214 of the second tubular 210, or by compressing the ring profiles 214 of the second tubular 210 around the ring profiles 114 of the first tubular 110, or a combination thereof. Resulting from the expansion or compression of the connection is that the ring profiles 114, 214 will mate and interlock to form separate and independent fluid seals as well as a mechanical lock able to hold the tubulars together during future expansion of the entire tubular and joint.

Also disposed on the end 212 of the second tubular 210 distal to the matching circumferential ring profiles is a mating shoulder 216. The corresponding mating shoulder 116 is seen on the first tubular 110. Prior to interlocking, the mating shoulders of the two tubulars ensure that the ring profiles of the two tubulars are aligned in an alternating arrangement.

In this view, the first tubular 110 and the second tubular 210 are ready to be made-up. Make-up is preferably done by expanding the end region of the first tubular from within, as with a conventional tubular expander or other devices known to those in the art, so as to plastically deform the ring profiles 114 into their mating ring profiles 214 of the second tubular 210. During the make-up process the ring profiles 114, 214 of the two tubulars 110, 210 are aligned for interlocking. The ring profiles of the respective tubulars are designed to align by the use of a mating shoulder 116, 216 disposed within each tubular. In this respect, the ring profiles 214 of the second tubular 210 are configured to mate with the ring profiles 114 of the first tubular 110. After expansion on the rig floor, the tubulars are ready to be run into the wellbore.

Figure 2:
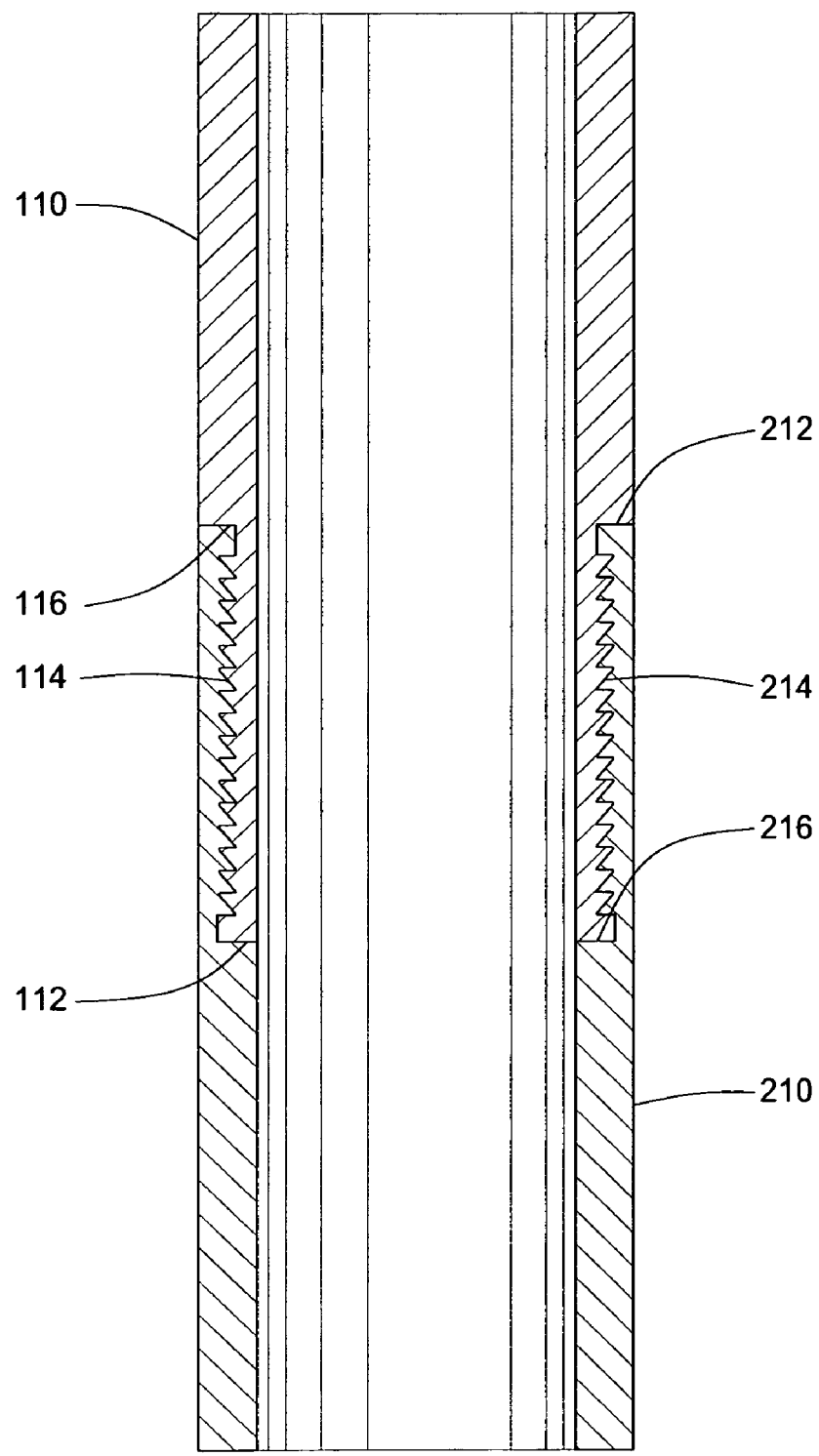
FIG. 2 is a cross-sectional view of the components after the connection has been made-up and the interlocking ring profiles have been mated and interlocked.

FIG. 2 is a side view illustrating the connector 100 after make-up. As described above, make-up is preferably accomplished by stabbing the pin, or first tubular 110, into the box, or second tubular 210, i.e., in the same manner as conventional threaded tubulars are made-up. The interlocking ring profiles 114 of the first tubular will align themselves with the interlocking ring profiles 214 of the second tubular due to the mating or stop shoulder 116, 216. In operation, the outer diameter of the first tubular end 112 is smaller than the inner diameter of the second tubular end 212. This differential in size allows the first tubular 110 to pass relatively untouched as it is stabbed into the second tubular 210. The first tubular 110 will stop and become aligned with the second tubular 210 when the end 112 of the first tubular makes contact with the mating shoulder 216 of the second tubular 210, or vice versa. It is also possible that the ends of each tubular will make contact with the mating shoulders of the other tubular at the same time.

As shown, each tubular's end is in contact with the shoulder of the other tubular. Consequently, before expansion or compression, the ring profiles 114 of the first tubular 110 are aligned and interlocked with the matching ring profiles 214 of the second tubular 210.

Figure 3:
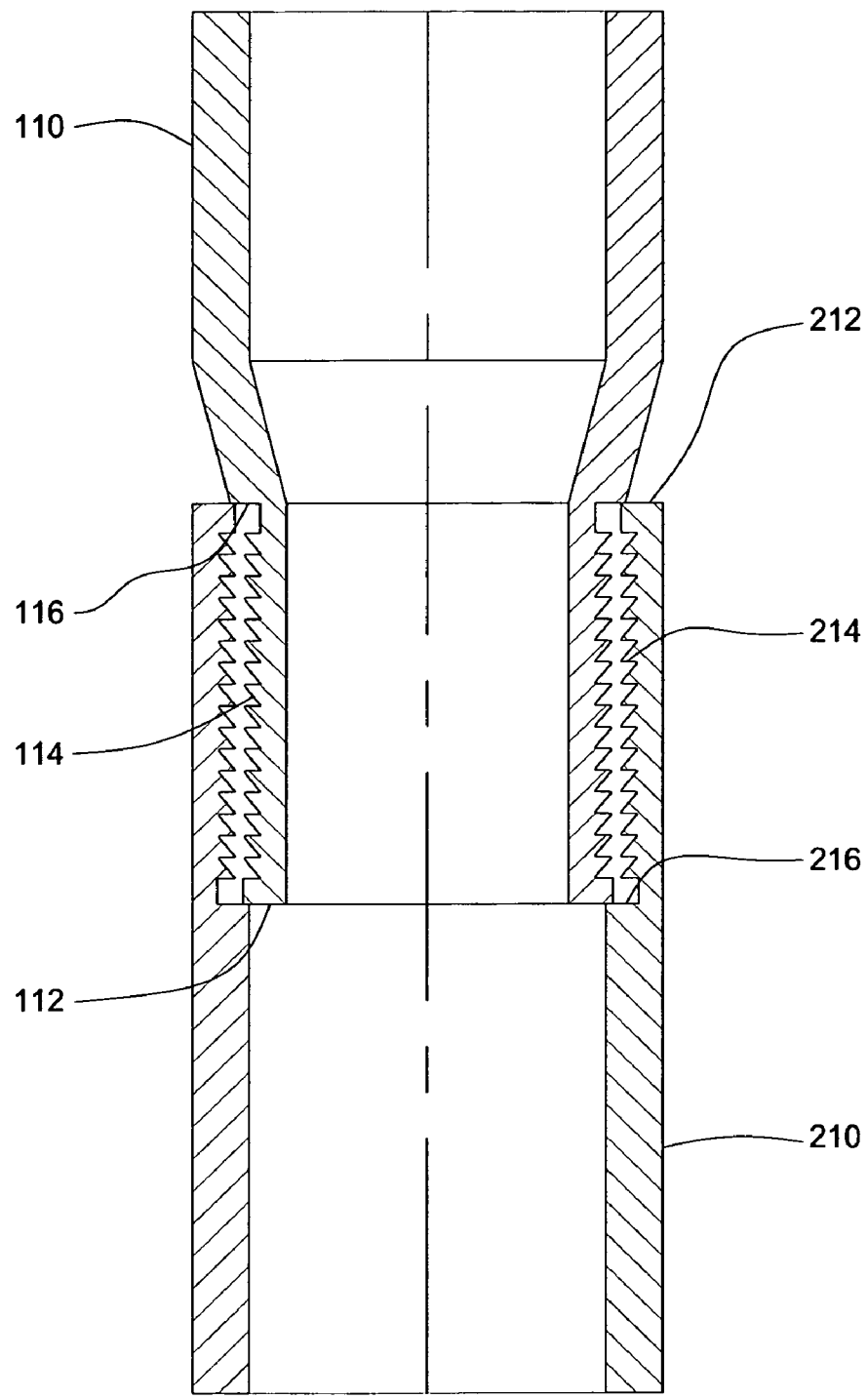
FIG. 3 is a cross-sectional view, of another possible embodiment, a connector of an upset-thread variety, with the two tubular members' ring profiles aligned for make-up.

FIG. 3 shows an upset-thread utilizing the connector arrangement of the present invention. In operation the interlocking ring profiles align and mate in the same manner as that described above. As illustrated, the tubulars have been stabbed together and the end 112 of the first tubular 110 is resting on the shoulder 216 of the second tubular 210. The ring profiles 114 of the first tubular 110 are aligned and ready to be interlocked with the matching ring profiles 214 of the second tubular 210. In practice, this would be accomplished by either expanding the first tubular 110 from within or by compressing the second tubular 210 around the first tubular 110, or a combination thereof.

Figure 4:
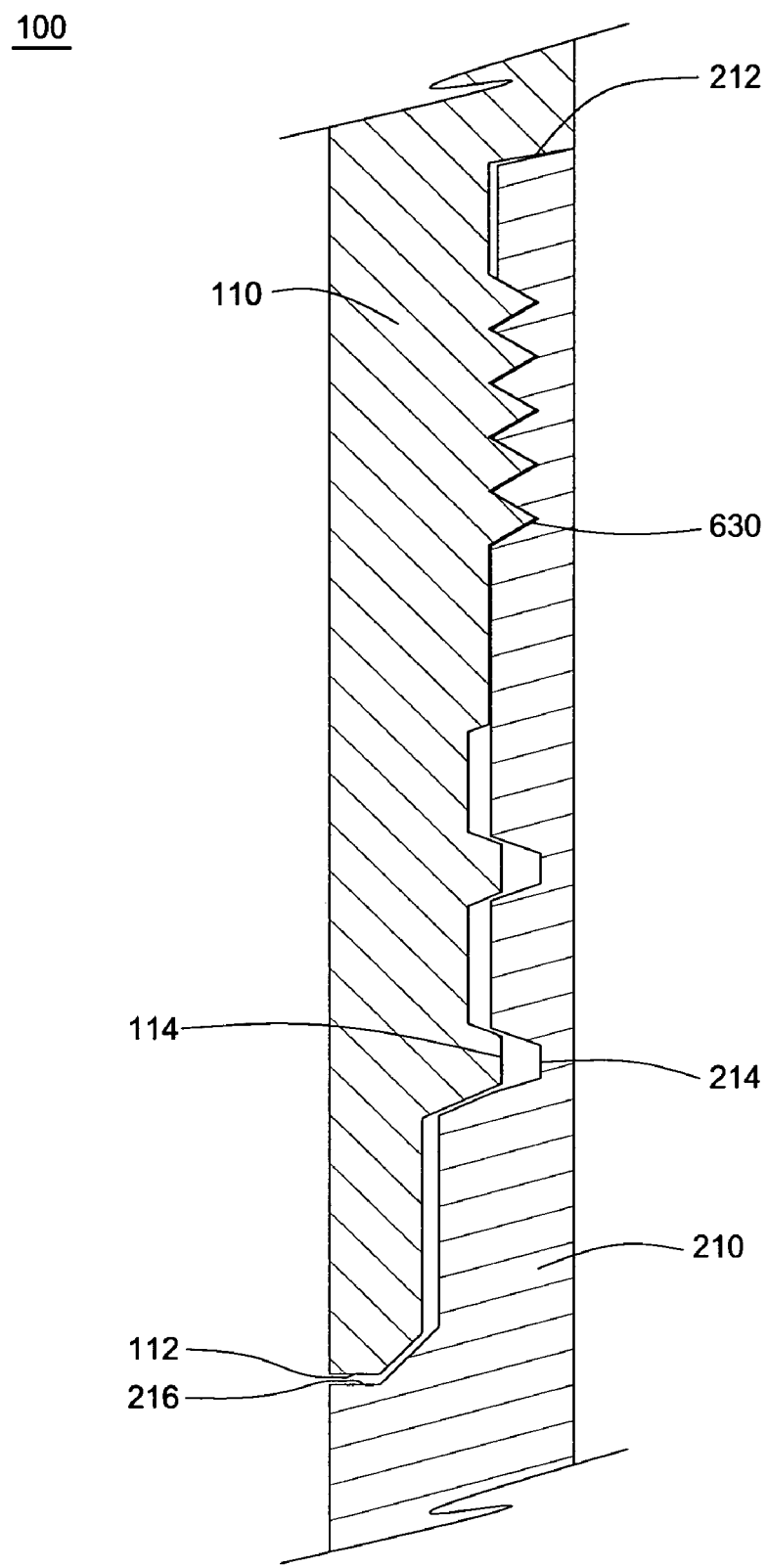
FIG. 4 is a cross-sectional view, of another possible embodiment, a connector using both conventional threads and interlocking ring profiles.

FIG. 4 is a cross-sectional view of a side-wall of another possible embodiment showing a combination of conventional threads 630 and interlocking ring profiles 114, 214 of the present invention. As illustrated, the tubulars have been stabbed together and threaded. In this view, the tubulars' ring profiles have not yet been interlocked. In practice it may be useful to have a combination of conventional threads 630 to hold the tubulars together prior to expansion of the first tubular 110 or compression of the second tubular 210. After threading the tubulars together the tubular joint could then be expanded without fear of the connection loosing its mechanical or sealing integrity. During expansion of the tubulars, which may now occur downhole, the ring profiles 114 of the first tubular 110 will mate and interlock with the ring profiles 214 of the second tubular 210. If the threaded connection becomes unmade the tubulars are still mated and interlocked via their mating ring profiles.

In the embodiment shown, after expansion there would exist an external upset at the area of the conventional threads 630. If this result would not be desirable, the embodiment described herein could alternatively be externally swedged inwardly at the area of the conventional threads 630 50 that after internal expansion of the connection the outer profile of the tubulars would remain flush.

Figure 5:
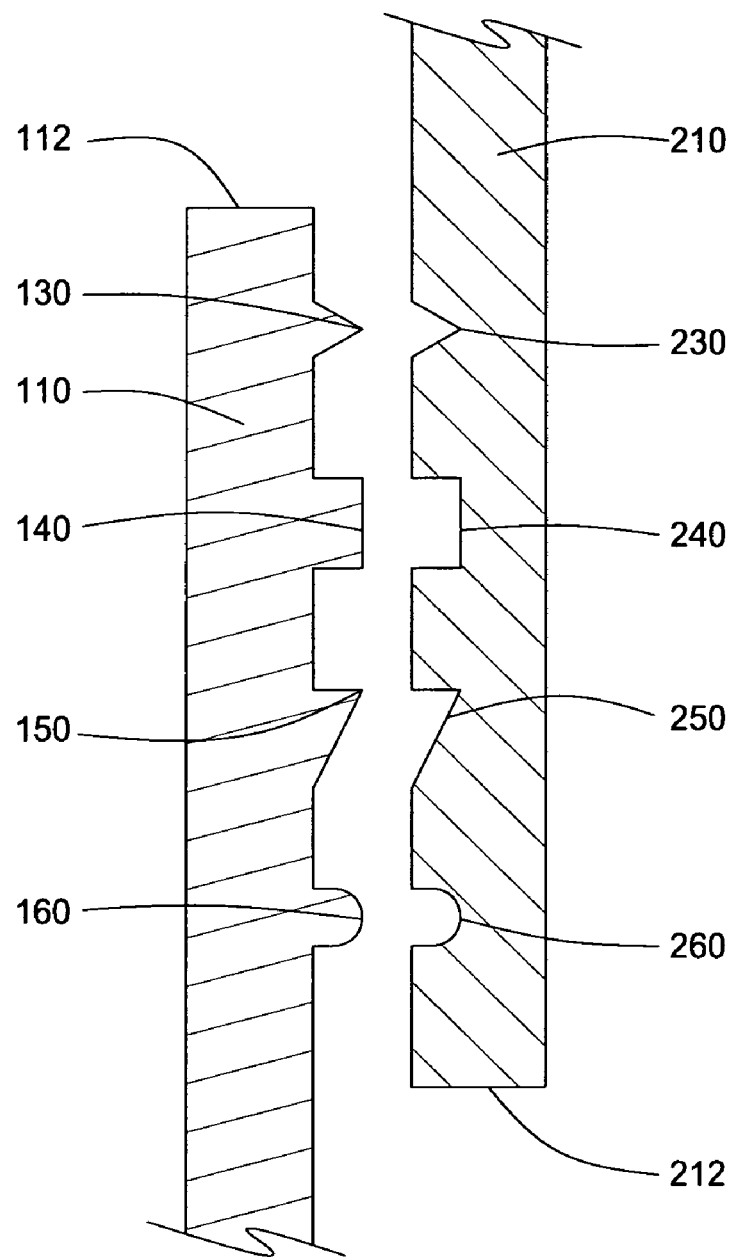
FIG. 5 is a cross-sectional view, of another possible embodiment, showing a representative sample of possible ring profile configurements.

FIG. 5 representatively illustrates alternative possible ring profiles of the present invention. As shown, the ring profile could be triangular in nature 130, rectangular 140, jagged or saw-toothed 150, and/or circular 160. Depending upon the sealing and mechanical integrity needed, the proper profile could be designed and machined. Each profile, regardless of its shape would have a matching profile 230, 240, 250, 260 to interlock with. Due to the infinite variety of profiles possible, only one possible configuration has been shown.

Figure 6:
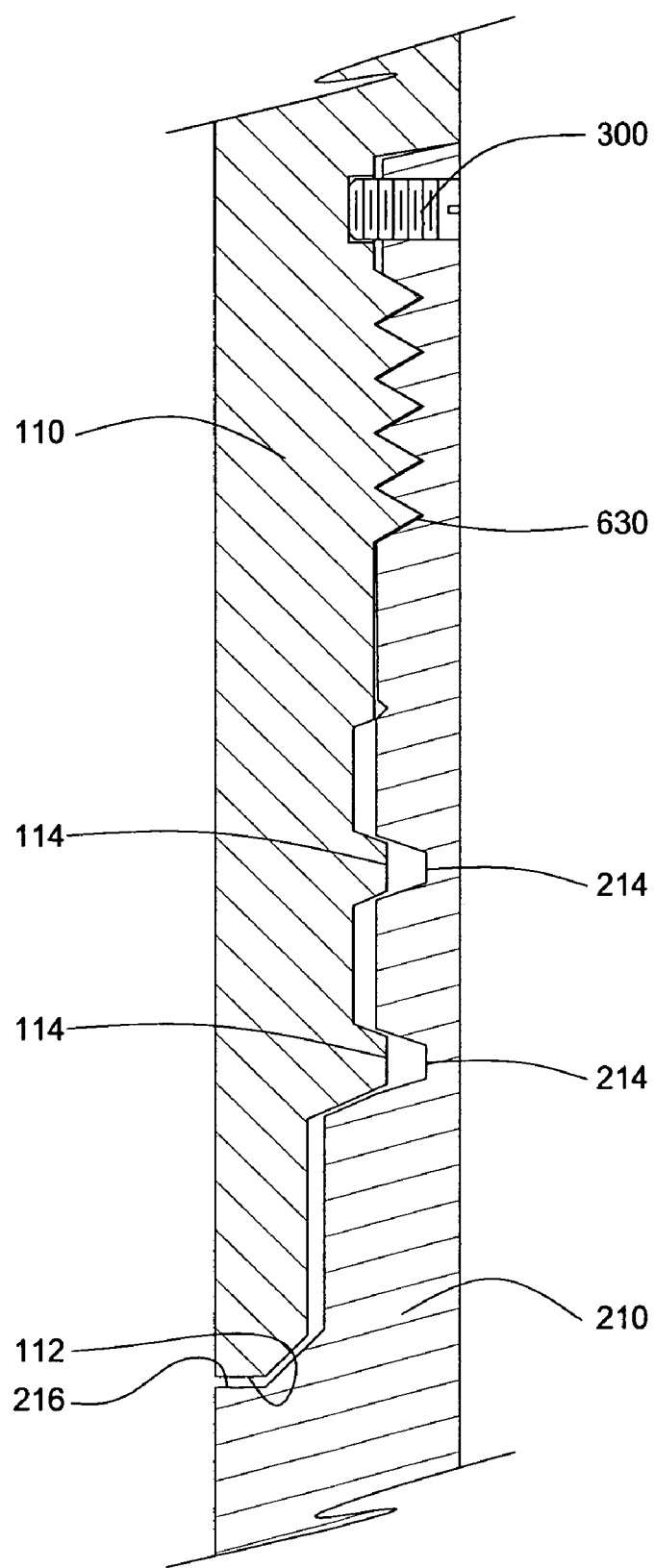
FIG. 6 is a cross-sectional view, of another possible embodiment, showing a connector similar to that shown in FIG. 4 incorporating torque screws.

FIG. 6 is a cross-sectional view of another possible embodiment of a connector similar to that illustrated in FIG. 4 incorporating torque screws. FIG. 6 shows a combination of conventional threads 630 and interlocking ring profiles 114, 214 of the present invention. As illustrated, the tubulars have been stabbed together and threaded. In this view, the tubulars' ring profiles have not yet been interlocked. In practice, it may be useful to have a combination of conventional threads 630 to hold the tubulars together prior to expansion of the first tubular 110 or compression of the second tubular 210. After threading the tubulars together the tubular joint could then be expanded without fear of the connection loosing its mechanical or sealing integrity. During expansion of the tubulars which may now occur downhole, the ring profiles 114 of the first tubular 110 will mate and interlock with the ring profiles 214 of the second tubular 210. If the threaded connection becomes unmade, the tubulars are still mated and interlocked via their mating ring profiles.

In the embodiment shown, there is also shown a torque resistance member, specifically a torque screw 300. The torque screw 300 is located near the conventional threads 630 of the tubulars and aids in resisting rotational movement of relation to its connecting tubular.

Figure 7:
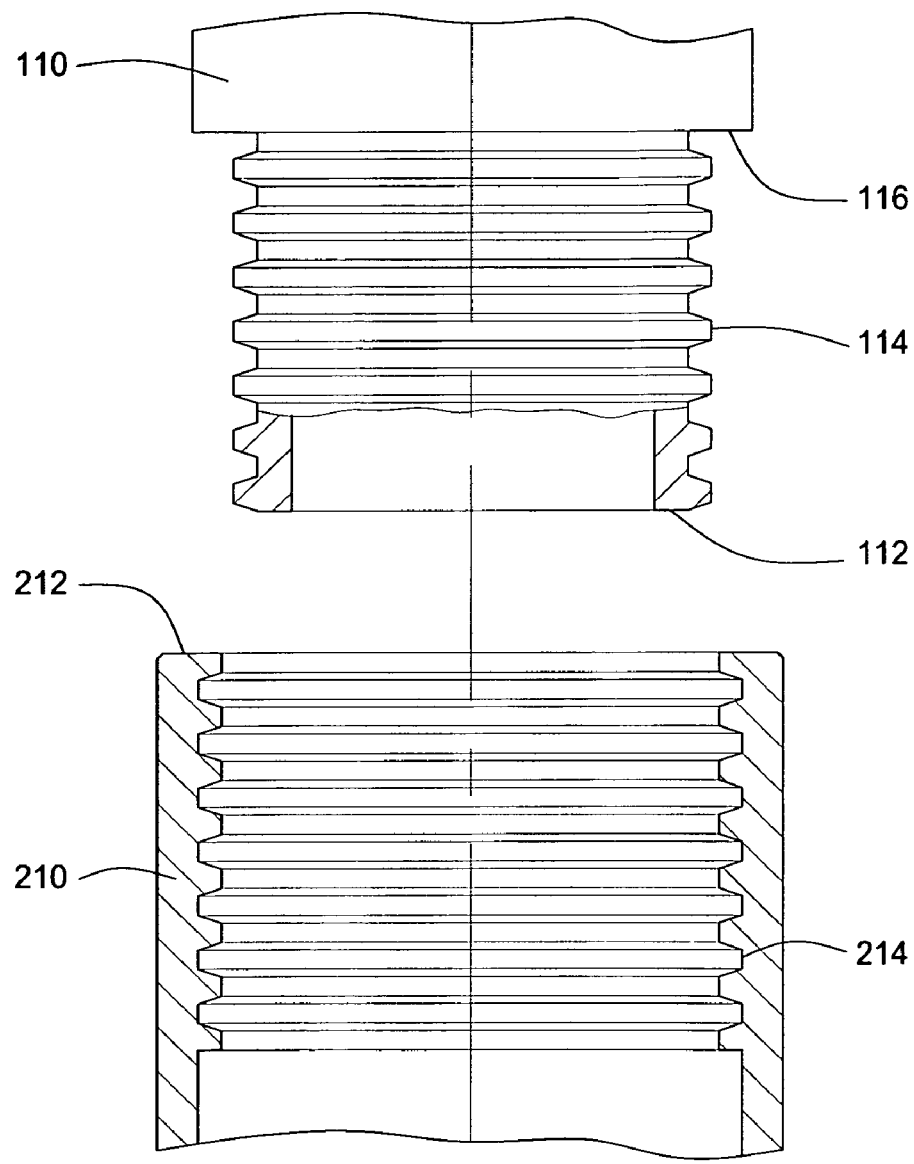
FIG. 7 is a cross-sectional view of a possible ring profile configurement.

FIG. 7 is a profile view illustrating the separate and distinct ring profiles of the first tubular 110 and their corresponding matching ring profiles of the second tubular 210. As shown, the tubulars are ready to be stabbed together. The ring profiles 114 of the first tubular 110 will make little or no contact with the ring profiles 214 of the second tubular during stab-in. Unlike conventional threads that have one fluid and mechanical path around the threads, here there are clearly distinct and separate connections.

Figure 8:
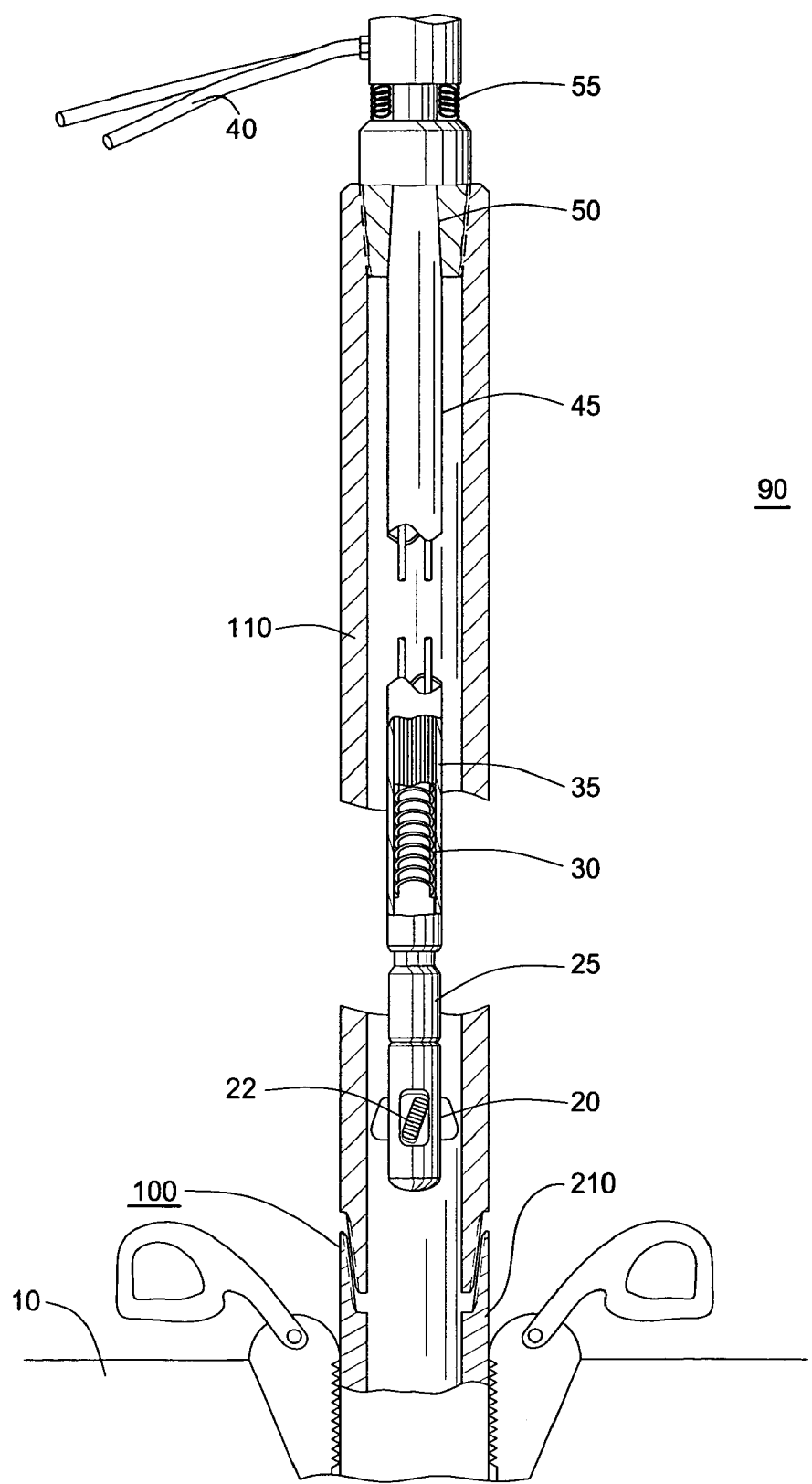
FIG. 8 is a representative view showing the make-up process of the tubulars, where in this view, a pin, or first tubular, is being expanded into a box, or second tubular, by a hydraulically operated closed-loop tubular expander.

Representatively shown in FIG. 8 are some of the components of the apparatus 90 used to make-up the tubulars. During make-up, the second tubular 210, or box tubular, is already positioned for stab-in on the rig floor 10. The first tubular 110, or pin tubular, is picked-up with an expander tool assembly 90 and moved into position for stab-in with the second tubular 210 which has already been placed into the rig floor 10 and is in position for a tubular to be connected to its upper or box end.

The expander assembly 90 consists of a rolling expander tool 20 wherein it is preferable that the pistons 22 are skewed such that the pistons will essentially drive themselves downward and across the connection area. The pistons 22 will act upon the inner diameter of the first tubular 110 so as to plastically deform the ring profiles (not shown) of the pin into their mating ring profiles located at the end of the second tubular 210. The pistons 22 contact the inner wall of the first tubular 110 when the hydraulic pressure within the system is sufficient enough to force the pistons 22 outward and into engagement with the first tubular 110. The expander tool 20 typically includes a body with at least two openings, each of which house a rolling expander member mounted on a piston like member which causes the rollers to extend outwardly radially while fluid pressure is applied thereto.

The rolling expander tool 20 is attached to a hydraulic drive motor 25 that in turn is attached to an extension tie tube 45. Within the extension tie tube 45, there exists a keyed stroke section 35 and a return spring 30 above the hydraulic drive motor 25. After expanding the pin in to the box, hydraulic pressure within the assembly 90 is decreased and the pistons 22 of the rolling expander tool 20 disengage from the first tubular 110. The return spring 30 then acts on the hydraulic drive motor 25 and rolling expander tool 20 to move them upwardly away from the connection 100.

Within the extension tie tube 45 are two hydraulic lines, a feed line and a return line 40. Above the extension tie tube 45 is a pick up collet assembly 50, known to those in the art, for moving tubulars on the surface. Shown above that is a spring stack 55. The collet 50 engages the box end of the first tubular 110 so that the tubular 110 and assembly 90 can move together over the rig floor 10.

After expansion of the tubular, the pistons 22 are retracted and the tubulars are lowered into the wellbore such that only the top portion of the first tubular 110, the box end of that tubular, is elevated above the rig floor 10. The expander tool assembly 90 is withdrawn from the first tubular 110 and is then ready to grab a following tubular and repeat the above process as required. The newly grabbed tubular acts as a first tubular and the tubular connection just lowered and expanded, with its box portion above the rig floor 10, acts as a second tubular ready for stab-in and mating.

The connection 100 could be expanded with the expander tool shown 20, that is by a rolling method, or also by pushing a cone or pig through the tubulars, as is known in the arts. Pushing a cone through the tubulars may cause an internal lip (not shown) due to the elastic recovery of the connection material after expansion. Consequently, a rolling element tool 20, like that shown, is preferential at this time.

The above elements are known to those in the art and represent a typical closed-loop hydraulic assembly used to transport and stab tubulars together on a rig floor. Of addition to that known, an expander assembly 90 is inserted into the first tubular 110 prior to stab-in such that the connection 100 may be made through use of an internal hydraulic expander tool 20. In this manner, the first tubular's ring profiles 114 are expanded into mating ring profiles 214 of the second tubular 210.

The connector arrangement shown in the above figures are simply an example of a connector of the present invention. Other arrangements and embodiments may be utilized within the spirit and scope of the present invention. For example, as shown in FIG. 4, a tubular connection could consist of mixing threaded connectors with interlocking ring profiles as described herein. The threaded connections could be located at the end of the tubulars or in between a series ring of profiles, or a combination thereof.

The elastic property of metal presents the possibility that when the pin expands by cold working into the box to form the connection the pin can tend to at least partially recover to its pre-expanded shape leaving a slight separation between the pin and the box. Alternatively, the box can tend to at least partially recover to its pre-expanded shape leaving a slight separation between the box and the pin when the box compresses by cold working onto the pin to form the connection. Whether the separation results from compression of the box or expansion of the pin, a loose connection can form that can leak or fail.

In order to avoid separation between the pin and the box, a non-expandable collar can be positioned around an outside diameter of the box during expansion of the pin such that additional force may be exerted during the expansion. The non-expandable collar allows application of additional stress to the pin while limiting the stress applied to the box. Therefore, applying stress beyond the elastic limits of the pin substantially limits elastic recovery of the pin while permitting elastic recovery of the box in order to form a tight connection. Similarly, an uncompressible anvil can be positioned in an inside diameter of the pin during compression of the box such that additional force may be exerted on the box during the compression. Therefore, applying stress beyond the elastic limits of the box substantially limits elastic recovery of the box while permitting elastic recovery by the pin.

In another embodiment that avoids loose connections between the pin and the box, the metal forming the box can have a higher yield strength than the metal forming the pin that is expanded. Since cold working the pin increases the pin's yield strength, it is more important that the yield strength of the pin remains lower than the yield strength of the box after expanding the pin to the point that the box at least partially expands due to contact with the pin. Therefore, the pin is expanded past its yield point in order to at least partially permanently deform the pin while the higher yield strength of the box permits more elastic recovery by the box relative to the pin in order to form a tight connection. Preferably the yield strength of the box is such that the box never reaches yield point during expansion, thereby substantially allowing elastic recovery by the box to its pre-expanded shape. In practice, the yield strength of the box can be increased relative to the pin by heat treating the box and not heat treating the pin even when the box and the pin are the same material. On the other hand, the yield strength of the pin can be reduced relative to the box by annealing the pin and not annealing the box even when the box and the pin are the same material. Alternatively, the metal composing the box can be selected from metals with a higher yield strength than the metal composing the pin. When compressing the box onto the pin to form the connection, the metal forming the pin can have a higher yield strength than the metal forming the box in order to form a tight connection.

In another embodiment for avoiding separation between the pin and the box, the metal composing the box can be selected from metals with a lower modulus of elasticity than the metal composing the pin that is expanded. Thus, following expansion the differences in elastic recovery due to the different modulus of elasticity between the pin and the box permit the box to recover more than the pin in order to form a tight connection. For example, a box composed of a titanium alloy with a modulus of elasticity of $15-17 \times 10^6$ psi recovers approximately twice as much as a pin composed of A106 Grade B steel with a modulus of elasticity of $29-30 \times 10^6$ psi. If the box is compressed onto the pin to form the connection, then selecting a metal composing the pin from metals with a lower modulus of elasticity than the metal composing the box can facilitate a tight connection.

While the foregoing is directed to embodiments of the present invention, other and further embodiments of the invention may be devised without departing from the basic scope thereof, and the scope thereof is determined by the claims that follow.

The invention claimed is:

1. A method of forming a connection between two tubulars, comprising:

substantially non-rotationally stabbing an end of a first tubular into an end of a second tubular to a position wherein a shoulder on the first tubular contacts a mating shoulder on the second tubular and at least one formation on an outer surface of the first tubular is adjacent at least one mating formation on an inside surface of the second tubular; and forming a connection between the first and second tubulars by employing an expansion tool to plastically deform at least a portion of either the first tubular, the second tubular, or both the first tubular and the second tubular in a manner wherein the formations are mated, thereby substantially preventing axial movement between the first tubular and the second tubular.

2. The method of claim 1 wherein the plastically deforming comprises expanding the portion of the first tubular.

3. The method of claim 2, wherein the end of the second tubular has a higher yield strength relative to the end of the first tubular.

4. The method of claim 2, wherein the end of the second tubular has a lower modulus of elasticity relative to the end of the first tubular.

5. The method of claim 2, wherein the end of the second tubular has a higher yield strength and a lower modulus of elasticity relative to the end of the first tubular.

6. The method of claim 2, further comprising heat treating the end of the second tubular to increase a yield strength of the end of the second tubular relative to the end of the first tubular.

7. The method of claim 2, further comprising annealing the end of the first tubular to decrease a yield strength of the end of the first tubular relative to the end of the second tubular.

8. The method of claim 2, further comprising constraining at least a portion of an outside diameter of the second tubular.

9. The method of claim 1, wherein the plastically deforming comprises compressing the portion of the second tubular.

10. The method of claim 9, wherein the end of the first tubular has a higher yield strength relative to the end of the second tubular.

11. The method of claim 9, wherein the end of the first tubular has a lower modulus of elasticity relative to the end of the second tubular.

12. The method of claim 9, wherein the end of the first tubular has a higher yield strength and a lower modulus of elasticity relative to the end of the second tubular.

13. The method of claim 9, further comprising heat treating the end of the first tubular to increase a yield strength of the end of the first tubular relative to the end of the second tubular.

14. The method of claim 9, further comprising annealing the end of the second tubular to decrease a yield strength of the end of the second tubular relative to the end of the first tubular.

15. The method of claim 9, further comprising constraining at least a portion of an inside diameter of the first tubular.

16. A connection between a first tubular and a second tubular, the connection comprising:
an end of the first tubular, the end having at least one formation formed on an outer surface thereof;
an end of the second tubular, the end coaxially disposable over the end of the first tubular and having at least one formation on an inside surface thereof, whereby the first tubular and the second tubular are matable together at a well surface through expansion, thereby causing plastic deformation of at least a portion of either the first tubular, the second tubular, or both the first tubular and the second tubular; and
a shoulder formed on the second tubular, whereby substantially non-rotationally stabbing the first tubular in the second tubular causes the shoulder to align the at least one formation on the first tubular with the at least one formation on the second tubular prior to forming the connection.

17. The connection of claim 16, wherein the plastic deformation comprises expanding the portion of the first tubular.

18. The connection of claim 17, wherein the end of the second tubular has a higher yield strength and a lower modulus of elasticity relative to the end of the first tubular.

19. The connection of claim 16, wherein the plastic deformation comprises compressing the portion of the second tubular.

20. The connection of claim 19, wherein the end of the first tubular has a higher yield strength relative to the end of the second tubular.

21. The connection of claim 19, wherein the end of the first tubular has a lower modulus of elasticity relative to the end of the second tubular.

22. The connection of claim 19, wherein the end of the first tubular has a higher yield strength and a lower modulus of elasticity relative to the end of the second tubular.

23. The connection of claim 16, wherein the at least one formation on the first tubular comprises an outwardly formed formation and the at least one formation on the second tubular comprises an inwardly formed formation.

24. The connection of claim 23, wherein the first tubular is constructed and arranged to be expanded and plastically deformed placing the at least one outwardly formed formation into a mating relationship with the at least one inwardly formed formation.

25. The connection of claim 16, wherein a thickness of the connection is substantially the same as a wall thickness of the first tubular and the second tubular.

26. The connection of claim 16, wherein the at least one formation on the inside surface includes a thread and the at least one formation on the outer surface includes a mating thread.

27. The connection of claim 16, further comprising a torque resistance member.

28. The connection of claim 27, wherein the torque resistance member consists of a torque screw.

29. A method of forming an expandable connection between tubulars, comprising:
placing a connection assembly within a first tubular at a location whereby an expander tool is adjacent an inside wall of a portion of the first tubular to form the connection;
transporting the connection assembly and the first tubular to a location whereby the portion of the first tubular to form the connection is substantially non-rotationally stabbed into and adjacent a portion of a second tubular to form the connection, wherein a shoulder on the first tubular contacts a mating shoulder on the second tubular;
expanding the portion of the first tubular into frictional contact with the second tubular to form the connection; and
removing the connection assembly from the first tubular.

30. A connection between a first tubular and a second tubular, the connection comprising:
an end of the first tubular, the end having at least one formation formed on an outer surface thereof; and
an end of the second tubular, the end coaxially disposable over the end of the first tubular and having at least one formation on an inside surface thereof, whereby the first tubular and the second tubular are matable together at a well surface by substantially non-rotationally stabbing the first tubular into the second tubular until a shoulder on the first tubular contacts a mating shoulder on the second tubular and by radial expansion, thereby causing plastic deformation of at least a portion of the first tubular, wherein the end of the second tubular has a higher yield strength relative to the end of the first tubular.

31. A connection between a first tubular and a second tubular, the connection comprising:
   an end of the first tubular, the end having at least one formation formed on an outer surface thereof; and
   an end of the second tubular, the end coaxially disposable over the end of the first tubular and having at least one formation on an inside surface thereof, whereby the first tubular and the second tubular are matable together at a well surface by substantially non-rotationally stabbing the first tubular into the second tubular until a shoulder on the first tubular contacts a mating shoulder on the second tubular and by radial expansion, thereby causing plastic deformation of at least a portion of the first tubular, wherein the end of the second tubular has a lower modulus of elasticity relative to the end of the first tubular.

* * * * *